US012157845B2

(12) United States Patent
Hun et al.

(10) Patent No.: US 12,157,845 B2
(45) Date of Patent: Dec. 3, 2024

(54) SELF-HEALING ADHESIVE COMPOSITION

(71) Applicants: UT-Battelle, LLC, Oak Ridge, TN (US); University of Tennessee Research Foundation, Knoxville, TN (US)

(72) Inventors: Diana Hun, Lenoir City, TN (US); Pengfei Cao, Knoxville, TN (US); Tomonori Saito, Knoxville, TN (US); Zhen Zhang, Knoxville, TN (US); Bingrui Li, Knoxville, TN (US); Natasha Ghezawi, Rock Top, TN (US)

(73) Assignees: UT-Battelle, LLC, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 259 days.

(21) Appl. No.: 17/117,827

(22) Filed: Dec. 10, 2020

(65) Prior Publication Data
US 2021/0189187 A1    Jun. 24, 2021

Related U.S. Application Data

(60) Provisional application No. 63/050,906, filed on Jul. 13, 2020, provisional application No. 62/946,569, filed on Dec. 11, 2019.

(51) Int. Cl.
*C09J 7/30* (2018.01)
*C08F 20/36* (2006.01)
(Continued)

(52) U.S. Cl.
CPC .............. *C09J 7/30* (2018.01); *C08F 20/36* (2013.01); *C08F 120/36* (2013.01);
(Continued)

(58) Field of Classification Search
CPC ...... C08F 220/36; C08F 120/36; C08F 20/36; C09J 133/14; C09J 7/10
See application file for complete search history.

(56) References Cited

U.S. PATENT DOCUMENTS

| 2,889,297 A | 6/1959 | Brander et al. |
| 3,274,142 A | 9/1966 | Warner |
| (Continued) | | |

FOREIGN PATENT DOCUMENTS

| CN | 108341960 A | * | 7/2018 |
| EP | 0 010 000 A1 | | 4/1980 |
| (Continued) | | | |

OTHER PUBLICATIONS

International Search Report and Written Opinion dated Sep. 22, 2021 issued in PCT/US20/64243, 13 pages.
(Continued)

*Primary Examiner* — Ling Siu Choi
*Assistant Examiner* — David L Miller
(74) *Attorney, Agent, or Firm* — Scully, Scott, Murphy & Presser, P.C.

(57) ABSTRACT

A self-healing adhesive composition comprising a homogeneous mixture of: (i) a self-healing polymer containing hydrogen bonding groups or long-chain alkyl groups, wherein said hydrogen bonding groups comprise hydrogen bond donating groups and hydrogen bond accepting groups, and wherein said long-chain alkyl groups contain at least four carbon atoms; and (ii) an extrudable adhesive polymer base having a curable property and no self-healable property; wherein component (i) is present in the self-healing adhesive composition in an amount of at least 10 wt % and up to 70 wt % of the total of components (i) and (ii). Also described herein is a method of sealing a space (e.g., crack, gap, or pores) in a substrate material by at least partially (Continued)

filling the space with the self-healing adhesive composition described above and permitting the self-healing adhesive composition to harden over time without applying an external stimulus to induce hardening.

8 Claims, 9 Drawing Sheets

(51) Int. Cl.
    *C08F 120/36*     (2006.01)
    *C09J 133/14*     (2006.01)
    *C08F 220/36*     (2006.01)

(52) U.S. Cl.
    CPC ........... *C09J 133/14* (2013.01); *C08F 220/36* (2013.01); *C09J 2433/00* (2013.01); *C09J 2475/00* (2013.01); *C09J 2483/00* (2013.01)

(56) References Cited

U.S. PATENT DOCUMENTS

| | | | |
|---|---|---|---|
| 3,561,996 A | 2/1971 | Young | |
| 3,661,744 A | 5/1972 | Kehr et al. | |
| 3,759,915 A | 9/1973 | Kottke | |
| 3,786,020 A | 1/1974 | Emmons | |
| 3,919,146 A | 11/1975 | Emmons | |
| 5,034,455 A | 7/1991 | Stein et al. | |
| 5,234,996 A | 8/1993 | Mori et al. | |
| 5,478,897 A | 12/1995 | Sasano et al. | |
| 9,388,201 B2 | 7/2016 | Moser et al. | |
| 2013/0243948 A1* | 9/2013 | Baker | G02B 6/02395 427/162 |
| 2014/0275375 A1* | 9/2014 | Sun | C08L 69/00 524/394 |
| 2019/0119428 A1* | 4/2019 | Yan | C08F 236/10 |

FOREIGN PATENT DOCUMENTS

| | | | |
|---|---|---|---|
| EP | 3225228 A1 | 10/2017 | |
| EP | 2351892 B1 | 6/2018 | |
| JP | 2013-071947 A | 4/2013 | |
| JP | 2016-199647 A | 12/2016 | |
| WO | WO-9610595 A1 * | 4/1996 | ............ C08G 18/06 |
| WO | 2008/057488 A2 | 5/2008 | |
| WO | 2015/061070 A1 | 4/2015 | |
| WO | WO-2018045866 A1 * | 3/2018 | ............ C08G 77/46 |
| WO | WO-2018056675 A2 * | 3/2018 | ............ C09J 11/06 |

OTHER PUBLICATIONS

Alauhdin, M., et al., "Monitoring morphology evolution within block copolymer microparticles during dispersion polymerisation in supercritical carbon dioxide: a high pressure SAXS study", Polymer Chemistry 2019, Received Nov. 6, 2018, Accepted Dec. 21, 2018, Published on Dec. 31, 2018, pp. 860-871, 10.

Buyl, F.D., "Silicone sealants and structural adhesives", International Journal of Adhesion & Adhesives (2001), Accepted Mar. 27, 2001, pp. 411-422, 21.

Jin, F-L., et al., "Synthesis and application of epoxy resins: A review", Journal of Industrial and Engineering Chemistry (2015), Received Jan. 8, 2015, Received in revised form Mar. 15, 2015, Accepted Mar. 28, 2015, Available online Apr. 4, 2015, pp. 1-11, 29.

Karnal, "Importance of Substrate Functionality on the Adhesion and Debonding of a Pressure-Sensitive Adhesive under Water", ACS Applied Materials & Interfaces 2017, Received Sep. 14, 2017, Accepted Nov. 6, 2017, Published Nov. 7, 2017, pp. 42344-42353, 9.

Marquez, I., et al., "Synthesis and Properties of Water-Based Acrylic Adhesives with a Variable Ratio of 2-Ethylhexyl Acrylate and n-Butyl Acrylate for Application in Glass Bottle Labels", Polymers 2020, Received Dec. 17, 2019, Accepted Feb. 11, 2020, Published Feb. 12, 2020, pp. 1-14, 12, 428.

Martin-Martinez, J.M., et al., "Adhesion properties and stability of polyurethane adhesive to synthetic rubber joints", International Journal of Adhesion and Adhesives, Jul. 1991, pp. 192-196, vol. 11, No. 3.

Necasova, B., et al., "Comparison of Adhesive Properties of Polyurethane Adhesive System and Wood-plastic Composites with Different Polymers after Mechanical, Chemical and Physical Surface Treatment", Polymers 2019, Received Jan. 20, 2019, Accepted Feb. 20, 2019, Published Mar. 1, 2019, pp. 1-17, 11, 397.

Raja, P.R., "Cyanoacrylate Adhesives: A Critical Review", Rev. Adhesion Adhesives, Dec. 2016, pp. 398-416, vol. 4, No. 4.

Takahashi, R., et al., "Kinetics of Morphological Transition between Cylindrical and Spherical Micelles in a Mixture of Anionic-Neutral and Cationic—Neutral Block Copolymers Studied by Time-Resolved SAXS and USAXS", Macromolecules 2018, Received Jan. 15, 2018, Revised Mar. 27, 2018, Published May 3, 2018, pp. 3654-3662, 51.

Urban, M.W., et al., "Key-and-lock commodity self-healing copolymers", Science 362, (2018), Oct. 12, 2018, pp. 1-6.

Yang, Y., et al., "Self-Healing of Polymers via Supramolecular Chemistry", Advanced Materials Interfaces 2018, pp. 1-19, 5, 1800384.

Zhu, D.Y., et al., "Self healing polymeric materials based on microencapsulated healing agents: From design to preparation", Progress in Polymer Science 49-50 (2015), Available online Jul. 26, 2015, pp. 175-220.

* cited by examiner

SELF-HEALING ADHESIVE COMPOSITION

CROSS REFERENCE TO RELATED APPLICATION

The present application claims benefit of U.S. Provisional Application No. 62/946,569, filed on Dec. 11, 2019, and 63/050,906, filed on Jul. 13, 2020, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention relates generally to hardenable or curable adhesive compositions, and more particularly, such compositions having a self-healing property. The adhesive compositions are particularly suited for sealing spaces, such as cracks or gaps, in a substrate material, particularly building or construction materials.

BACKGROUND OF THE INVENTION

High-performance elastomers are widely used in various industries, including automotive, building construction, and flexible electronics/devices. Improving their performance and longevity will not only expand their utility but also help conserve natural resources towards a more sustainable future. Elastomers that have self-healing capabilities should have longer service lifetimes, thereby providing a significant improvement over current technologies.

Various methodologies have been developed for the preparation of self-healing elastomers, including the development of self-healing materials requiring the use of an external stimulus, such as heat, light, or pressure. However, the need for a stimulus makes these self-healing materials largely impractical, thus limiting their capabilities in key areas of need, such as infrastructure, aerospace, and deep-sea exploration. Consequently, the development of autonomous (intrinsic) self-healing elastomers is of substantial interest. However, little progress has been made in achieving autonomous self-healing materials, particularly those with improved physical properties (e.g., high adhesion force, high toughness, and high modulus) required for maintaining sufficient integrity in materials used in critical applications.

SUMMARY OF THE INVENTION

The present invention is foremost directed to self-healing adhesive compositions (i.e., "adhesive compositions") that can be applied, in the same manner as caulking, sealant, or patch material, onto a substrate material. Similar to caulking or sealant material, the composition will harden (cure) over time, but without requiring an elevated temperature, electromagnetic radiation, or pressure to initiate hardening or a subsequent self-healing process. Moreover, by virtue of the exceptional adhesive force of adhesive compositions described herein, they can be advantageously applied without a primer (i.e., in primer-less fashion). The adhesive compositions described herein achieve these properties by including in the composition a self-healing polymer containing either hydrogen bonding groups (capable of hydrogen bonding with each other reversibly in the self-healing polymer) or long-chain alkyl groups, or both. The adhesive compositions described herein exhibit strong adhesion forces on dusty services. Moreover, the self-healing process is substantially unaffected or not affected at all by the presence of water or moisture. In some embodiments, the self-healing process can occur under water.

More particularly, the adhesive composition includes a homogeneous mixture of: (i) a self-healing polymer containing hydrogen bonding groups or long-chain alkyl groups, wherein the hydrogen bonding groups contain hydrogen bond donating groups and hydrogen bond accepting groups, and wherein the long-chain alkyl groups may be linear, branched, or cyclic and contain at least four saturated carbon atoms connected by carbon-carbon bonds; and (ii) an extrudable adhesive polymer base having a curable property and no self-healable property after curing; wherein component (i) is present in the self-healing sealant composition in an amount of at least 10 wt % and up to 70 wt % of the total of components (i) and (ii).

In some embodiments, the self-healing composition is an autonomously self-healable, highly adhesive elastomer ("ASHA-Elastomer") prepared using a synthetic self-healing polymer and curable elastomers. The self-healing process of the developed ASHA-Elastomers is autonomous and intrinsic; that is, they do not require external stimuli or encapsulated chemicals. Mechanical properties are recovered after the self-healing process at ambient condition or under water. Most notably, unlike regular adhesive elastomers with adhesion greatly impaired by the presence of dust on substrates, the ASHA-Elastomers described herein display comparable adhesion on both clean and dusty surfaces with exceptional adhesion force, e.g., up to or at least 3500 $N\ m^{-1}$, which greatly surpasses the bonding strength of tendon and cartilage to bone in many animals (800 $N\ m^{-1}$) (M. Moretti et al., *J. Biomech.*, 38, 1846, 2005). This adhesion value is at least or better than many of the currently reported adhesive self-healing elastomers.

BRIEF DESCRIPTION OF THE FIGURES

FIG. 2A shows the chemical structure of Poly(BCOE). FIG. 2B shows the $^1H$ NMR spectrum of Poly(BCOE). FIG. 2C schematically demonstrates the exceptional elasticity of Poly(BCOE).

FIG. 3A shows IR spectra of a curable elastomer (C1-Elastomer), a self-healable polymer (Poly (BCOE)), and ASHA-C1-Elastomers (homogeneous mixture of Poly(BCOE) and C1-Elastomer) with different weight ratios of Poly(BCOE) to C1-Elastomer (0, 10, 30, 50, and 100 wt % Poly(BCOE) from top to bottom of the graph). FIG. 3B shows DSC curves of the C1-Elastomer, ASHA-C1-Elastomer-50, and Poly(BCOE).

FIG. 4A includes plots showing shear modulus (G' and G") for C1-Elastomer and 10, 30, and 50 wt % Poly(BCOE) in homogeneous mixtures of Poly(BCOE) and C1-Elastomer. FIG. 4B is a plot of tensile stress tests of ASHA-C1-Elastomers. FIG. 4C is a plot of ten successive loading-unloading cycles of a film prepared from ASHA-C1-Elastomer-30.

FIG. 5A is a photographic scheme showing the healing process of ASHA-C1-Elastomer, wherein the damaged sample was healed for 2 days at ambient condition before the tensile test. FIG. 5B is a schematic showing ink tests for C1-Elastomer and the ASHA-C1-Elastomer-50 self-healed after being completely cut.

FIG. 6A is a plot of peel strength (as provided by peel tests) of ASHA-C1-Elastomers on an Al substrate. FIG. 6B is a photograph showing the prepared ASHA-Elastomers on an Al substrate (left side) and a schematic illustration of the 180° C. peel test (right side). FIG. 6C is a chart comparing adhesion of ASHA-Elastomers with reported values from the literature. FIG. 6D is a plot of peel strength of ASHAC1-Elastomers on a dusty surface. FIG. 6E is an illustration of the adhesion improvement of ASHA-C1-Elastomers on dusty surfaces as a result of the encapsulation effect of Poly(BCOE).

DETAILED DESCRIPTION OF THE INVENTION

Figure 1:
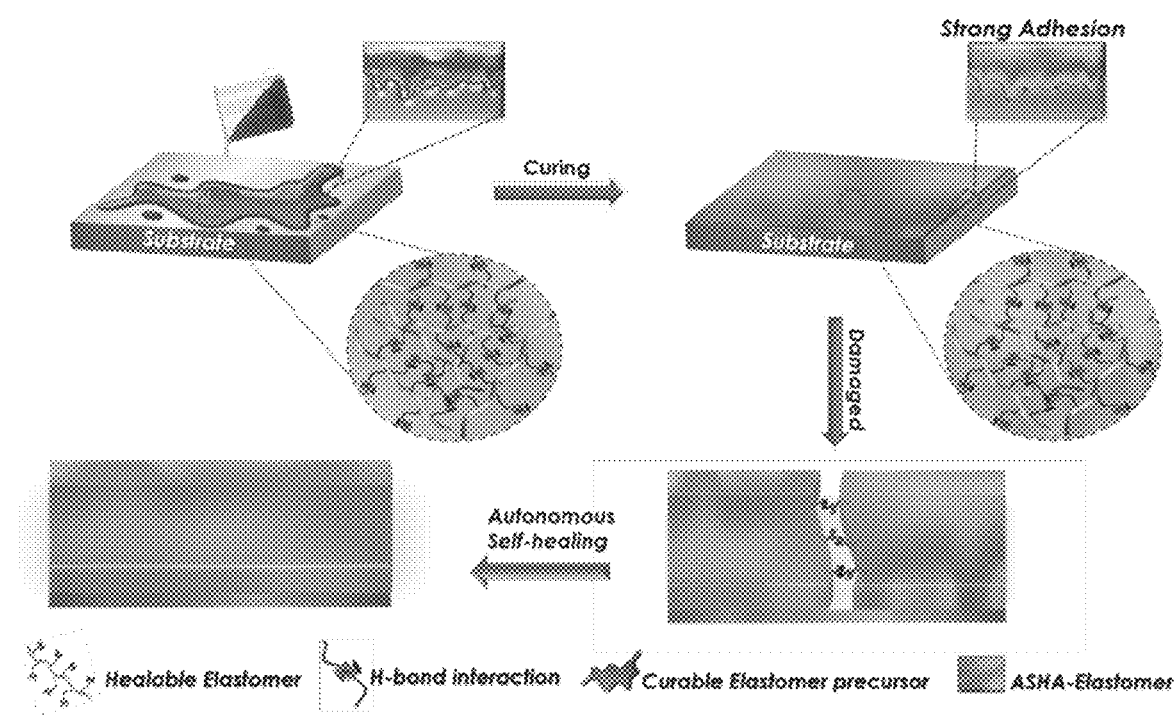
FIG. 1. Schematic depiction of the strong adhesive and self-healing ability of the autonomously self-healable adhesive elastomers (ASHA-Elastomers) described herein on a substrate (e.g., aluminum). As shown, the self-healing process occurs through hydrogen bond interactions and molecular dynamics of the self-healable polymer, such as poly(2-[[(butylamino)carbonyl]oxy]ethyl acrylate), i.e., Poly (BCOE).

In one aspect, the present disclosure is directed to a self-healing adhesive composition (i.e., "adhesive composition"). The adhesive composition includes, as a first component, a self-healing polymer. The adhesive composition includes, as a second component, an extrudable adhesive polymer base. The two components are present as a homogeneous mixture in the adhesive composition. The term "homogeneous," as used herein, refers to a mixture of such uniformity that the individual components cannot be discerned. The term "adhesive," as used herein, refers to a property of strongly adhering (i.e., sticking or bonding) to another material (substrate). The term "self-healing," as used herein, refers to a property of at least partially reversing a defect (e.g., a void or crack) that forms in the adhesive composition after it has been applied to and solidifies (by curing) on a substrate material. For purposes of the invention, the adhesive composition has a semi-solid consistency, akin to caulk or plaster, when being applied, and is extrudable or otherwise capable of being easily formed into a shape, such as by pushing through a die, a caulk gun, or by pressing with a spatula, to apply onto a substrate material, after which time the adhesive composition gradually hardens while on the substrate material.

In one embodiment, the adhesive composition possesses at least the adhesion strength of typical commercial caulking or sealant compositions. In other embodiments, particularly on dusty surfaces, the adhesive composition possesses a greater adhesion strength than typical commercial caulking compositions. For example, in some embodiments, the adhesive composition possesses such exceptional adhesion strength (e.g., at least or above 2000, 2500, 3000, 3200, or 3500 N·m$^{-1}$) that it can be applied to a substrate substantially coated with dust, without the use of a primer, i.e., the adhesive composition can be used in a primer-less mode. In another embodiment, the adhesion composition also possesses a sealant property, thereby also functioning as a sealant.

The adhesive composition may also exhibit outstanding mechanical properties, particularly in elongation at break and toughness (or modulus). The adhesive composition may possess an elongation at break of at least or above, for example, 100%, 200%, 500%, 800%, 1000%, 1200%, 1500%, 1800%, 2000%, 2100%, 2200%, or 2500%, or an elongation at break within a range bounded by any two of the foregoing values (e.g., 1000-2500% or 1500-2500%). The adhesive composition may possess a toughness of at least or above, for example, 1.0, 1.1, 1.2, 1.3, 1.4, 1.5, 1.6, 1.7, 1.8, 1.9, 2.0, 2.5, 3.0, 3.5, 4.0, 5.0, 6.0, 7.0, or 8.0 MJ/m$^3$, or a value within a range bounded by any two of the foregoing values.

In one embodiment, the self-healing polymer, which is also herein referred to as the "first component" or "component (i)," contains hydrogen bonding groups as the groups responsible for imparting a self-healing property. The hydrogen bonding groups include a combination of hydrogen bond donating groups and hydrogen bond accepting groups within the self-healing polymer. The presence of the hydrogen bonding groups results in reversible hydrogen bonding interactions between and/or within polymer molecules, and this provides the self-healing property. Hydrogen bond donating and accepting groups are well known in the art. Some examples of hydrogen bond donating groups include —NH—, —NH$_2$, —OH, and —SH groups, wherein —NH— is a linkage between carbon atoms in a linear, branched, or cyclic hydrocarbon. Some examples of hydrogen bond accepting groups include carbonyl (—C(O)—), thiocarbonyl (—C(S)—), imine (—N=), ether (—O—), and thioether (—S—) groups. In some embodiments, the polymer contains any one or more hydrogen bond donating groups provided above combined with any one or more hydrogen bond accepting groups described above. In some embodiments, the polymer contains one or more complex hydrogen bonding groups, wherein each complex hydrogen bonding group contains a mixture of hydrogen bond donating and accepting portions. Some examples of complex hydrogen bonding groups include amide (—NHC(O)), thioamide (—NHC(S)), urea (—NHC(O)NH—), thiourea (—NHC(S)NH—), and urethane (carbamate, i.e., —NHC(O)O—) groups. The self-healing polymer may or may not contain pendant groups (i.e., groups attached to the backbone of the polymer), wherein the pendant groups typically contain at least one, two, three, or more methylene (—CH$_2$—), methyl (—CH$_3$), and/or or methine (—CH(-)—) linkages or groups. In some embodiments, some or all of the hydrogen bonding groups are located in the backbone of the self-healing polymer. In other embodiments, some or all of the hydrogen bonding groups are located in pendant groups of the self-healing polymer. In yet other embodiments, some hydrogen bonding groups are located in the backbone of the self-healing polymer while other hydrogen bonding groups are located in pendant groups of the self-healing polymer. A wide range of self-healing polymers containing hydrogen bonding groups are known in the art, such as described in Y. Yang et al., *Adv. Mater. Interfaces,* 5, 1800384, 2018, the contents of which are herein incorporated by reference. The self-healing polymer containing hydrogen bonding groups may be organic, inorganic, or hybrid. In some embodiments, the self-healing polymer containing hydrogen bonding groups is a vinyl addition polymer (e.g., acrylate or methacrylate) or a polysiloxane.

In more specific embodiments, the self-healing polymer is a vinyl-addition polymer with pendant groups containing hydrogen bonding groups. The vinyl-addition polymer typically possesses an acrylate, methacrylate, or acrylamide backbone. The vinyl-addition polymer may more specifically have the following structure:

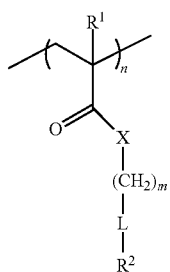

(1a)

In Formula (1a), the variable n is typically an integer of at least or greater than 10, 20, 30, 40, 50, 100, 200, 500, or 1000. The variable m is typically an integer of precisely or at least 1, 2, 3, 4, 5, or 6, or m is within a range bounded by any two of the foregoing values (e.g., 2-6 or 2-4). The variable X is O or NH, which results in the self-healing polymer being an acrylate/methacrylate or acrylamide, respectively. The variable L is a linkage containing a combination of hydrogen bonding and accepting groups, e.g., —NHC(O)—, —NHC(O)O—, or —NHC(O)NH—, or any of the other complex hydrogen bonding groups described above. The variable $R^1$ is typically hydrogen atom or methyl. The variable $R^2$ is typically a hydrogen atom or a hydrocarbon group containing precisely or at least one, two, three, four, five, or six carbon atoms or a number of carbon atoms within a range bounded by any two of the foregoing values (e.g., 1-6, 2-6, or 3-6 carbon atoms).

In a second embodiment, the self-healing polymer (first component) contains long-chain alkyl groups as the groups responsible for imparting a self-healing property. The long-chain alkyl groups may be linear, branched, or cyclic and contain at least four carbon atoms. In different embodiments, the long-chain alkyl groups contain precisely, at least, or more than four, five, six, seven, eight, nine, ten, eleven, or twelve carbon atoms. Some examples of long-chain alkyl groups include n-butyl, sec-butyl, isobutyl, n-pentyl, isopentyl, n-hexyl, isohexyl, 2-ethylhexyl, n-heptyl, n-octyl, n-nonyl, n-decyl, n-undecyl, n-dodecyl, cyclopentyl, methylcyclopentyl, cyclohexyl, and methylcyclohexyl groups. Due to the substantial hydrophobic character of the long-chain alkyl groups compared to remaining parts of the polymer molecules, the long-chain alkyl groups tend to reversibly self-associate, and this provides the self-healing property. The self-healing polymer containing long-chain alkyl groups may be organic or hybrid organic-inorganic. In some embodiments, the self-healing polymer containing long-chain alkyl groups is a vinyl addition polymer (e.g., acrylate or methacrylate) or a polysiloxane.

In more specific embodiments, the self-healing polymer is a vinyl-addition polymer with pendant groups containing long-chain alkyl groups. The vinyl-addition polymer typically possesses an acrylate, methacrylate, or acrylamide backbone. The vinyl-addition polymer may more specifically have the following structure:

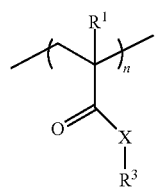

(1b)

In Formula (1b), the variable n is typically an integer of at least or greater than 10, 20, 30, 40, 50, 100, 200, 500, or 1000. The variable X is O or NH, which results in the self-healing polymer being an acrylate/methacrylate or acrylamide, respectively. The variable $R^1$ is typically hydrogen atom or methyl. The variable $R^3$ is a linear, branched, or cyclic alkyl group containing precisely, at least, or more than four, five, six, seven, eight, nine, ten, eleven, or twelve carbon atoms or a number of carbon atoms within a range bounded by any two of the foregoing values (e.g., 4-12, 4-10, or 4-8 carbon atoms). The specific examples provided above for long-chain alkyl groups also serve as examples of $R^3$.

The extrudable adhesive polymer base, which is also herein referred to as the "second component" or "component (ii)," confers the adhesive composition with its primary adhesive and textural (i.e., semi-solid, extrudable, adhesive, and shapeable) properties. Consistent with the adhesive polymers of the art, the second component does not possess a self-healable property. The extrudable adhesive polymer base can have any of the caulk or sealant compositions well-known in the art. That is, any of the numerous caulk and sealant compositions well known in the art, many of which are commercially available, may serve as the extrudable adhesive polymer base. The extrudable adhesive polymer base may have any of the compositions known in the art, such as, for example, a silicone-based, acrylate-based (including cyanoacrylate-based or methylmethacrylate-based), epoxy-based, vinyl-addition, vinyl ether-based, or polyurethane composition, all of which are well known in the art. Acrylate-based adhesive polymers are described in, for example, I. Marquez et al., *Polymers*, 12, 428, 2020 (doi: 10.3390/polym12020428) and P. R. Raja, *Reviews of Adhesion and Adhesives*, 4(4), 398-416, 2016 (cyanoacrylate adhesives), the contents of which are herein incorporated by reference. Silicone sealants and structural adhesives are described in, for example, F. de Buyl, *International Journal of Adhesion & Adhesives*, 21, 411-422, 2001 (silicone sealants and structural adhesives) and E. Kirillov et al. and U.S. Pat. No. 5,034,455 (silicone caulk compositions), the contents of which are herein incorporated by reference. Epoxy resins and adhesives are described in, for example, F.-L. Jin et al., *Journal of Industrial and Engineering Chemistry*, 29, 1-11, 2015, the contents of which are herein incorporated by reference. Vinyl-addition and vinyl ether adhesives and sealants are described in, for example, U.S. Pat. Nos. 3,561,996, 2,889,297, and EP0010000, the contents of which are herein incorporated by reference. Polyurethane-based adhesives are described in, for example, B. Necasova et al., *Polymers*, 11(3), 397, 2019; J. M. Martin-Martinez et al., *International Journal of Adhesion and Adhesives*, 11(3), 192-196, July 1991; and U.S. Pat. Nos. 5,478,897 and 5,234,996, the contents of which are herein incorporated by reference. Other types of known caulking and sealant compositions are considered herein, such as those based on alkyds, such as described in, for example, U.S. Pat. Nos. 3,786,020, 3,919,146 and 3,759,915, and those including a polythiol component, such as described in, for example, U.S. Pat. Nos. 3,661,744 and 3,274,142.

Component (i) is typically present in the self-healing adhesive composition in an amount of at least 10 wt % and up to 70 wt % of the total (sum) of components (i) and (ii). In different embodiments, component (i) is present in the self-healing adhesive composition in an amount of, for example, 10 wt %, 15 wt %, 20 wt %, 25 wt %, 30 wt %, 35 wt %, 40 wt %, 45 wt %, 50 wt %, 55 wt %, 60 wt %, 65 wt %, or 70 wt %, or an amount within a range bounded by any two of the foregoing values, such as 10-50 wt %, 10-40 wt %, 10-30 wt %, or 10-20 wt %.

In another aspect, the present disclosure is directed to a method of producing the adhesive composition described above. The adhesive composition is prepared by integrally mixing components (i) and (ii) to result in a homogeneous mixture of components (i) and (ii) by any of the means well known in the art for integrally mixing semi-solid components. In some embodiments, the components are subjected to a slightly elevated temperature of, for example, 35° C., 40° C., 45° C., 50° C., 55° C., 60° C., 70° C., 80° C., 90° C., or 100° C. during mixing of the components. With particular respect to component (i), methods for producing a range of self-healing polymer compositions are well known in the art. In the particular case of self-healing polymers according to Formulas (1a) and (1b), vinyl-addition polymerization methods, as well known in the art, may be used for their synthesis.

In another aspect, the present disclosure is directed to a method of sealing a space (e.g., gap) in a material (i.e., substrate) by use of the above-described self-healing adhesive composition. In some embodiments, the space being sealed may be substantially small in size and possibly present as a multiplicity of such spaces, such as in a porous substrate. Any of the above embodiments or specific examples of self-healing adhesive compositions may be used in the method of sealing a space in a material. Similarly, any of the specific examples of each of the individual components (i) and (ii) described above may be independently selected and combined to result in the self-healing adhesive composition used in the method. In the method, the self-healing adhesive composition is applied onto the substrate material by any suitable means as commonly used with caulk or spackling (e.g., caulking gun, spatula, knife, or hand) to at least partially fill in a space of the material. The substrate material is typically a construction material, typically one containing or constructed of gypsum (e.g., wall board, dry wall, sheet rock, plasterboard), metal (e.g., steel or aluminum), wood, cement, concrete, brick, ceramic, clay, or plastic.

As provided primarily by component (ii), the adhesive composition cures and hardens over time. In one embodiment, the adhesive composition cures and hardens upon exposure by an external stimulus, such as heat or electromagnetic radiation (e.g., ultraviolet). In another embodiments, the adhesive composition cures and hardens without an external stimulus, except perhaps for the presence of humidity or oxygen in air under ambient conditions. As provided by component (i), the adhesive composition is capable of self-healing in the event the adhesive composition, after hardening, acquires a defect, such as a crack, which may be within the adhesive composition or between the adhesive composition and the substrate material. Notably, component (i) permits the adhesive composition to self-heal under room temperature conditions (e.g., 15-30° C. or about 20-25° C.) in the absence of an external stimulus (e.g., electromagnetic radiation, elevated temperature, or pressure), and also in the absence of encapsulated chemicals. Moreover, the hardened adhesive composition may possess an exceptionally high adhesive strength, such as characterized by an adhesion force between the adhesive composition and substrate of at least or greater than 500 N·m$^{-1}$, 1000 N·m$^{-1}$, 1500 N·m$^{-1}$, 2000 N·m$^{-1}$, 2500 N·m$^{-1}$, 3000 N·m$^{-1}$, 3500 N·m$^{1}$, 4000 N·m$^{1}$, 4500 N·m$^{1}$, or 5000 N·m$^{1}$, or an adhesion force within a range bounded by any two of the foregoing values. By virtue of the exceptional adhesion strength of the adhesive composition, the adhesive composition may also be applied to a substrate without first priming the substrate with any of the priming agents well known in the art.

Examples have been set forth below for the purpose of illustration and to describe certain specific embodiments of the invention. However, the scope of this invention is not to be in any way limited by the examples set forth herein.

EXAMPLES

This study reports a series of autonomous self-healable and highly adhesive elastomers (ASHA-Elastomers) that are fabricated via a simple, efficient, and scalable process. The obtained elastomers exhibit outstanding mechanical properties with elongation at break up to 2102% and toughness (modulus of toughness) of 1.73 MJ m$^{-3}$. Notably, the damaged ASHA-Elastomer can autonomously self-heal with full recovery of functionalities, and the healing process is not affected by the presence of water. The elastomers were found to possess an ultrahigh adhesion force up to 3488 N m$^{-1}$, greatly outperforming previously reported self-healing adhesive elastomers. Furthermore, the adhesion force of the ASHA-Elastomer is negligibly affected by dust on the surface, in stark contrast to conventional adhesive polymers which have adhesion strengths very sensitive to dust. The successful development of high-toughness, autonomous self-healable, and ultra-adhesive elastomers will permit a wide range of applications with enhanced longevity and versatility, including their use as sealants, adhesives, and elastomers.

The ASHA-Elastomers were prepared by combining a synthetic self-healing polymer and curable elastomer. The self-healing process of the developed ASHA-Elastomers is autonomous and intrinsic; that is, they do not require external stimuli or encapsulated chemicals. Mechanical properties are fully recovered after the self-healing process at ambient condition or under water, and the mechanical properties are comparable to most of the state-of-the-art self-healable materials (e.g., H. Guo et al., *ACS Appl. Mater. Interfaces*, 11, 33356, 2019; Y. Zhuo et al., *ACS Appl. Mater. Interfaces*, 10, 11972, 2018; and D. Son et al., *Nat. Nanotechnol.*, 13, 1057, 2018). Most notably, unlike conventional adhesive elastomers with adhesion greatly impaired by dust on the substrates, the ASHA-Elastomers produced herein display comparable adhesion on both clean and dusty surfaces, with adhesion forces of even 3500 N m$^{-1}$ observed, which greatly surpasses the bonding strength of tendon and cartilage to bone in many animals (800 N m$^{-1}$) (e.g., M. Moretti et al., *J. Biomech.*, 38, 1846, 2005). In some cases, the adhesion values observed herein substantially exceed those reported for conventional adhesive elastomers.

Synthesis of Poly(PBCOE) Self-Healing Polymer

Figure 2A:
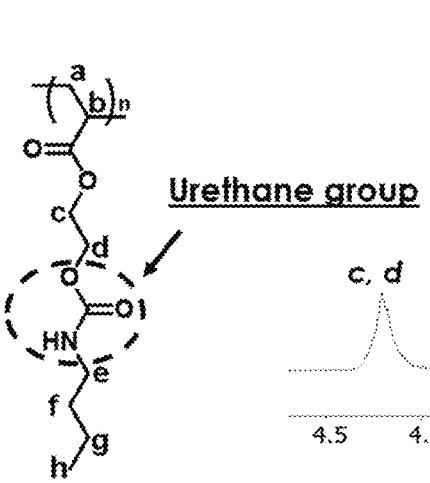
FIGS. 2A-2C.
Figure 2B:
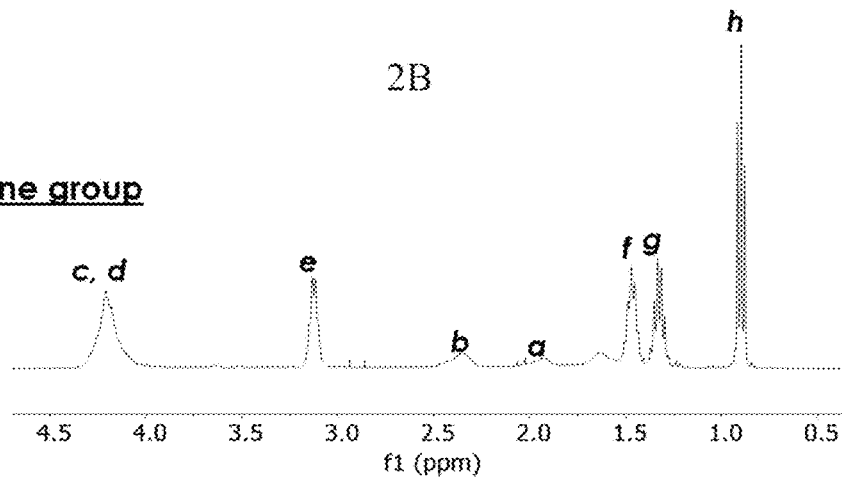
Figure 2C:
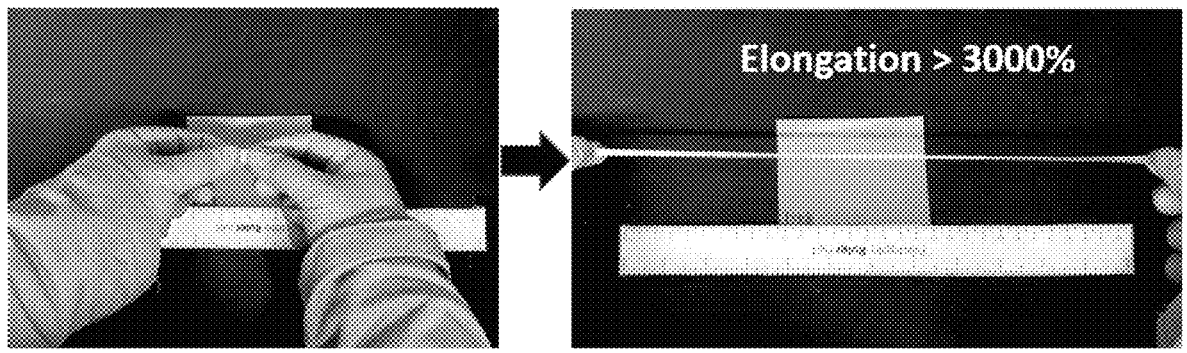

Ten grams of 2-[[(butylamino)carbonyl]oxy]ethyl acrylate (BCOE) monomer (46.5 mmol) and 15.2 mg of azobisisobutyronitrile (0.0926 mmol) were charged into a round-bottom flask and dissolved in 20 mL of anhydrous dimethylformamide. After a 30 minute purge with nitrogen gas while stirring, the solution was heated in an oil bath at 68° C. for 24 hours. The crude product was precipitated in 300 mL of deionized water. The sticky white precipitate was collected and dissolved in ethyl acetate, then precipitated in 300 mL of hexane, after which the process was repeated two more times. The final product was then collected in a Teflon dish and the leftover organic solvent was removed by placing the product in a vacuum oven for 48 hours. The chemical structure of Poly(BCOE) is shown in FIG. 2A and was confirmed by $^1$H NMR, as shown in FIG. 2B. The obtained Poly(BCOE) exhibits excellent extensibility with elongation at break of more than 3000%. FIG. 2C schematically demonstrates the exceptional elasticity of Poly(BCOE). The low glass transition temperature ($T_g \approx -3°$ C.), and hence, fast segmental dynamics at ambient temperature along with the numerous sacrificial hydrogen bonds of urethane groups (circled in FIG. 2A), imparted the self-healing property to the obtained elastomer system.

Preparation and Characterization of ASHA-Elastomers

The designed ASHA-Elastomers are composed of self-healable poly(2-[[(butylamino)carbonyl]oxy]ethyl acrylate) (Poly(BCOE)) and curable elastomer (C-Elastomer). The arrangement and function of the two components are schematically depicted in FIG. 1. The C-Elastomers, including silicon-based elastomers, i.e., C1-Elastomer and C2-Elastomer, and polyurethane-based elastomer, i.e., C3-Elastomer, generate high adhesive force due to the following two processes: 1) good contact of the elastomer precursors (liquid-like) with the substrate; and 2) the subsequent moisture-triggered chemical cross-linking process that leads to formation of high-toughness elastomers.

Poly(BCOE) and C-Elastomers were mixed at a temperature of 40-50° C. and subsequently applied to several substrates, after which the obtained ASHA-Elastomer precursors were allowed to cure at 30° C. for 1 week. By varying the weight ratio of Poly(BCOE) and C-Elastomers from 1:9 to 3:7 and eventually to 5:5, a series of self-healable, highly-adhesive elastomers, namely ASHA-C-Elastomers-n, where C is the type of curable elastomer and n is the weight percentage of Poly(BCOE), were produced.

In experiments, Poly(BCOE) was transferred into a small Teflon dish with a diameter of 7 cm and weighed out. Then the curable elastomer precursor with desirable amount was weighed out in the same Teflon dish. Keeping each part of the mixture on two sides of the dish, the Poly(BCOE) was heated with a heat gun and mixed with C1-, C2-, or C3-Elastomer precursors. The moisture-triggered curing process occurred at ambient condition, and the preparation described below was performed immediately after making the blend.

Figures 3A, 3B:
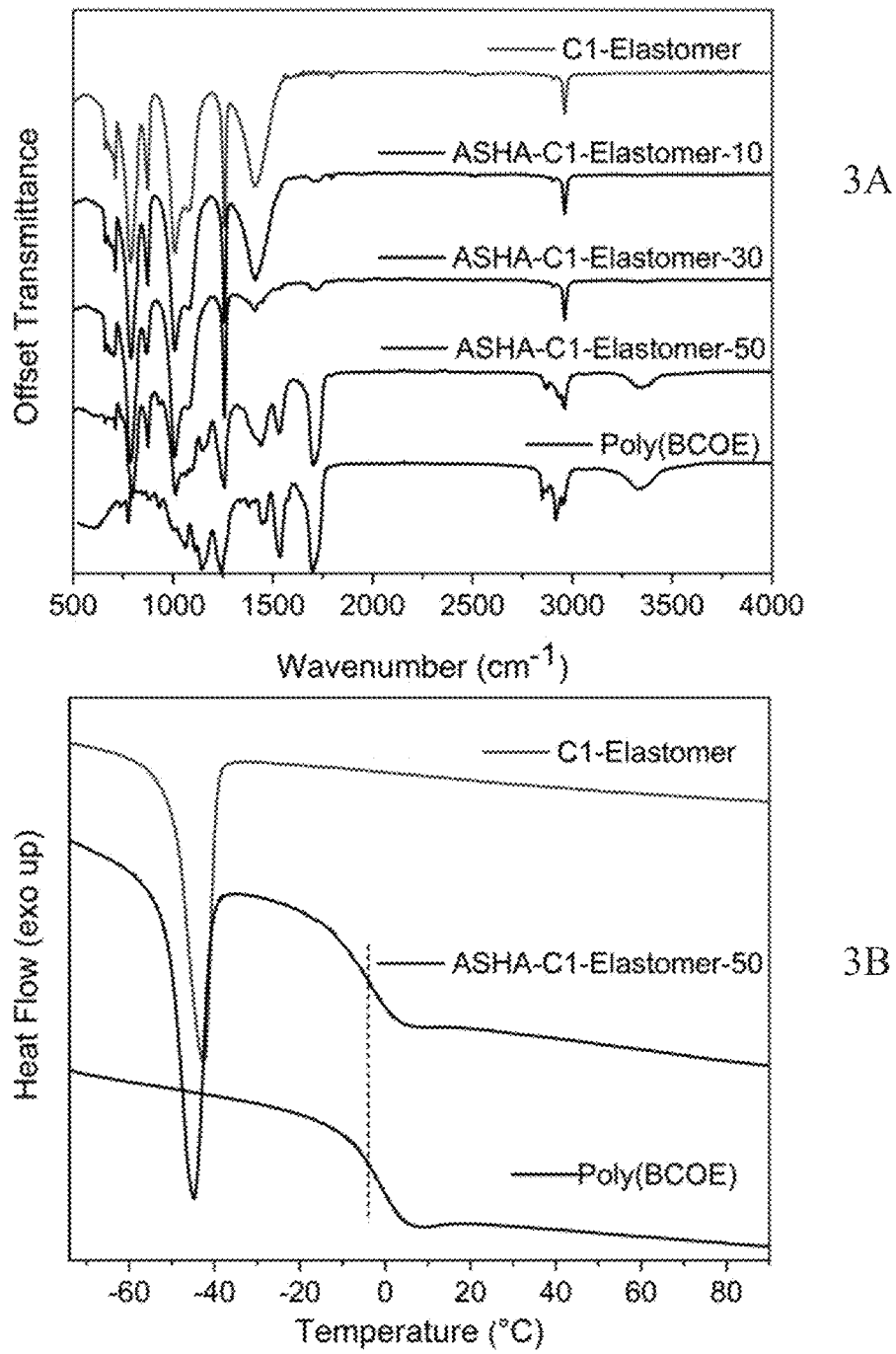
FIGS. 3A-3B.

The characteristic chemical structure of Poly(BCOE) was revealed by infrared (IR) spectroscopy, as shown in FIG. 3A. Peaks at ca. 3340, 1700, and 1530 cm$^{-1}$ correspond to N—H stretching, C=O stretching, and N—H bend, respectively, of which the intensity are gradually enhanced from top to bottom, owing to the increased contents of Poly(BCOE). The obtained elastomers exhibit good thermostability with no weight loss observed up to 250° C. The differential scanning calorimetry (DSC) curve (FIG. 3B) of ASHA-C1-Elastomer displays a melting temperature ($T_m$) at −45° C. and $T_g$ at −3° C., originating from silicon-based C1-Elastomer and Poly(BCOE), respectively. The clear presence of the $T_g$ from Poly(BCOE) along with its unshifted position in the DSC curve of the ASHA-C1-Elastomer indicates the presence of multiphases in the obtained elastomers. Also, no significant peaks observed in the small-angle X-ray scattering (SAXS) spectrum of ASHA-C1-Elastomer-50 demonstrate the absence of long-range ordered phase behavior in the ASHAC1-Elastomer, which is in contrast with block copolymer systems that show ordered phase behavior (R. Takahashi et al., *Macromolecules*, 51, 3654, 2018 and M. Alauhdin et al., *Polym. Chem.*, 10, 860, 2019). This phase behavior could be critical for the materials to synergistically inherit the properties from both components and improve the overall performance, as observed in other multicomposite polymer systems.

Samples for Tensile Analysis: Five grams of Poly(BCOE)/sealant mixture was spread on a Teflon sheet at a thickness of 2 mm. After curing for one week, the sample was cut into 7 mm×40 mm strips. For the self-healing samples, the strips were taken and cut either halfway or completely and placed side-by-side, which was left under ambient condition for 2 days. The samples were tested with the Instron® 3343 Universal Testing System following the ASTM D1708 standard, and the reported tensile data are an average of three samples.

Rheology Measurement: The viscoelastic properties of the ASHA Elastomers were probed by small amplitude oscillatory shear measurements through a strain-controlled mode of the AR2000ex (TA Instruments) in an angular frequency range of $10^{-1}$-$10^2$ rad s$^{-1}$ using parallel plate geometry, with a disk diameter of 4 mm. The gap between plates was about 1 mm for all the samples. Before each measurement, the sample was annealed at 100° C. for 10 minutes to remove the thermal history. Then the sample was quenched at a temperature near $T_g$ before a frequency sweep was conducted at different temperatures. Prior to each frequency sweep measurement, the sample underwent thermal stabilization for 5 minutes to ensure that thermal equilibrium had reached.

Dynamic Mechanical Analysis: Hysteresis analysis was performed. Sample preparation was the same as that for tensile analysis, and films were cut into approximately 18.0×5.0×0.5 mm specimens. Samples were elongated to 100% strain and then back to 0% strain at a constant rate of 1 mm s$^{-1}$, and ten cycles of testing were performed for each sample.

Samples for Peel Test: Two different aluminum molds were prepared: one with a thickness of 2 mm and the other with a thickness of 4 mm. A 50.8 mm×76.2 mm×1.27 mm aluminum substrate was used for peel test of each sample. The aluminum plate was taped at the bottom and the 2 mm thick mold was placed on top. Half of the mixture was placed on the substrate and smoothed out evenly using the mold. A 23 mm strip of 304 McMaster-Carr Stainless Steel Wire Cloth with 100×100 mesh size and 0.0055 opening size was then embedded on the placed mixture followed by replacing the 2 mm thick mold with a 4 mm thick mold. The rest of the mixture was placed on the embedded wire mesh and spread evenly, making the entire specimen 4 mm thick. The sample was cured for 1 week at 30° C. and then tested with the universal testing machines following the ASTM C794 test standard.

Samples for Dust Test: A 50.8 mm×76.2 mm×1.27 mm aluminum plate was submerged in a container of MIL-STD-810G Blowing Dust for 4 hours before sample preparation. The average amount of blowing dust on each aluminum plate was around 54.5 mg. After the plate was dusted, the peel test preparation above was followed.

Mechanical Properties

Figure 4A:
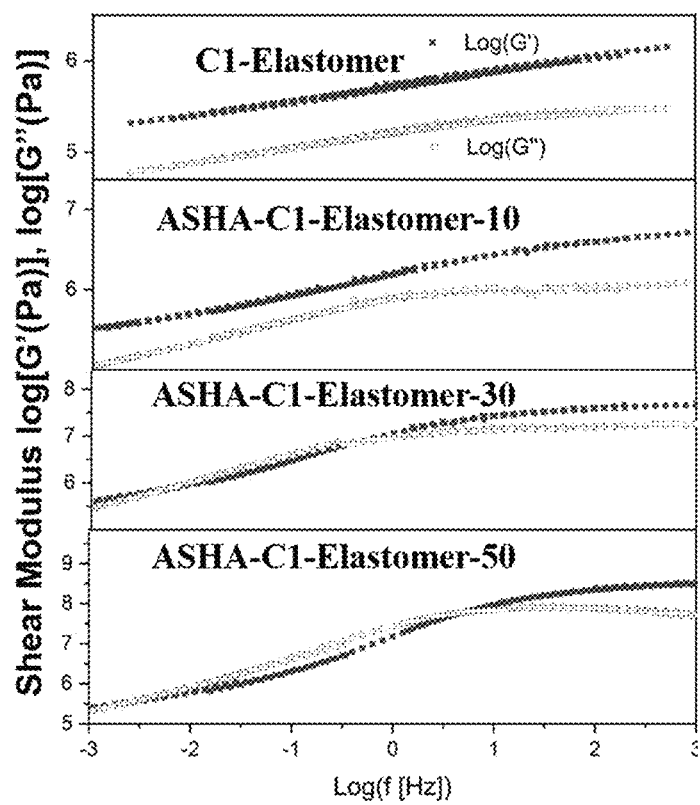
FIGS. 4A-4C.

The mechanical properties of the designed elastomers are critical to various applications, and they can be probed through their viscoelasticity. Therefore, a rheometer was first used to evaluate the viscoelastic behaviors of the ASHA-C1-Elastomers with different weight ratios of Poly(BCOE). The shear modulus (G' and G") results are shown in FIG. 4A. The ASHA-C1-Elastomers show more solid-like (elastic modulus (G')>loss modulus (G")) behavior over the frequency range at ambient temperature, which indicates mechanical robustness of the elastomers (P. F. Cao et al., *Adv. Funct. Mater.*, 28, 1800741, 2018). Compared with the high G' value of the C1-elastomer, the G' values of ASHA-C1-Elastomers decrease with the increased ratios of Poly (BCOE). This can be explained by the gradually decreased cross-linking densities of ASHA-C1-Elastomers with increased ratio of Poly(BCOE). Moreover, as indicated by the closer values of G' curves and G" curves, increasing the content of Poly(BCOE) confers a more liquid-like character on the ASHA-C1-Elastomers (i.e., faster molecular dynamic), which is critical to maintain their self-healing ability and develop a high adhesion strength to dusty surfaces as discussed later. To study the temperature effect on the modulus, dynamic mechanical analysis (DMA) was performed. Compared to the C1-Elastomer, the addition of Poly(BCOE) increased both G' and G" of ASHA-C1-Elastomers at temperature below 0° C. due to the glassy state of Poly(BCOE). The modulus experienced a gradual drop from 0 to 40° C., which is essential to the efficient recovery of mechanical properties at temperature above 0° C. as further demonstrated later.

Figure 4B:
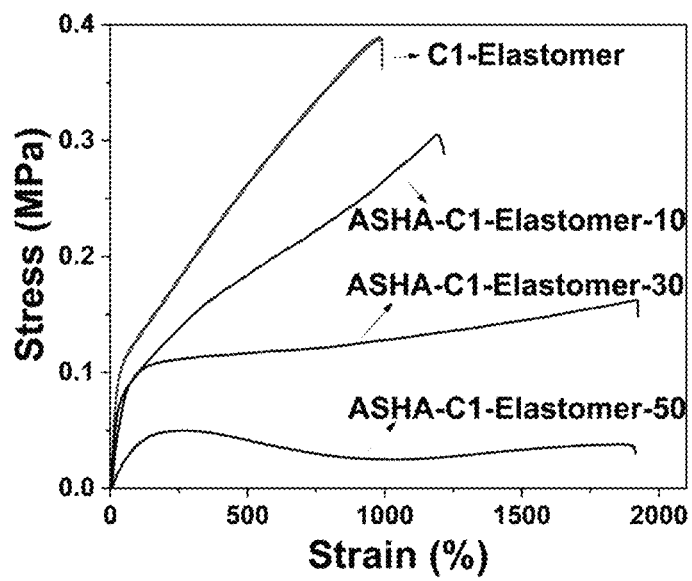

Mechanical properties of the elastomers were also investigated by tensile tests, as shown in FIG. 4B. The results are also shown in Table 1 below. Compared with other reported self-healable adhesive elastomers, the designed ASHA-C1-Elastomers exhibit either comparable or higher mechanical performance in terms of Young's modulus, extensibility, and ultimate tensile strength. All of the ASHA-C1-Elastomers display great extensibility with elongation at break higher than 1000%, which can be further enhanced to 2000% by increasing the weight ratio of Poly(BCOE). Both Young's modulus and ultimate tensile strength of the ASHA-C1-Elastomers gradually decreased with increased ratio of Poly (BCOE) due to the reduced cross-linking density, which is consistent with the rheology measurements.

TABLE 1

Mechanical properties of ASHA-C1-Elastomers.

| Material | G' (Pa) [a] | Young's Modulus (MPa) | Elongation at Break (%) | Toughness (MJ/m³) | Ultimate Tensile Strength (MPa) |
|---|---|---|---|---|---|
| C1-Elastomer | 209,512 | 0.62 ± 0.05 | 1060.5 ± 55.3 | 2.91 ± 0.18 | 0.39 ± 0.00 |
| ASHA-C1-Elastomer-10 | 42,401 | 0.59 ± 0.05 | 1189.5 ± 19.4 | 2.17 ± 0.43 | 0.28 ± 0.02 |
| ASHA-C1-Elastomer-30 | 17,958 | 0.48 ± 0.05 | 2101.8 ± 14.4 | 1.73 ± 0.08 | 0.14 ± 0.01 |
| ASHA-C1-Elastomer-50 | 1,995 | 0.14 ± 0.02 | 2003.3 ± 55.3 | 0.16 ± 0.02 | 0.022 ± 0.002 |

[a] the plateau value of the shear modulus in the master-curve.

Figure 4C:
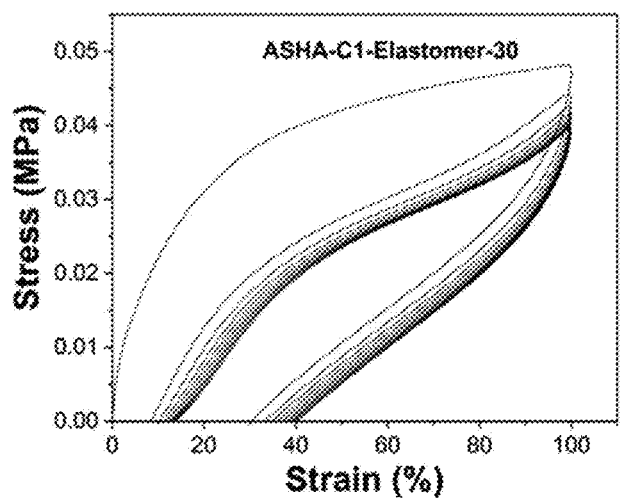

The overall toughness of ASHA-C1-Elastomer-10 and ASHAC1-Elastomer-30 is comparable, which may be due to "sacrificial" non-covalent interactions from Poly(BCOE) compensating for the dissipation energy loss with lower chemical cross-linking density in the system (M.-C. Luo et al., Polymer, 106, 21, 2016). In order to investigate the effects of Poly(BCOE) on the properties of other elastomeric systems and enlarge the library of these adhesive self-healing materials, ASHA-Elastomers composed of C2-Elastomers or C3-Elastomers were also prepared following the same procedures as for C1-Elastomer. Compared with ASHA-C1-Elastomers, ASHA-C2-Elastomers and ASHAC3-Elastomers generally exhibited improved Young's modulus, toughness, and ultimate tensile strength. They showed elongation at break in the range of 500-1000%, which is relatively lower than that of ASHA-C1-Elastomers but still better compared to most of the reported adhesive self-healing elastomers. The elastic recovery of ASHA-Elastomers was investigated by applying 10 cycles of 0-100% strain, as shown in FIG. 4C. As shown, they display good elastic recovery. For example, the remaining stress of ASHA-C1-Elastomer-30 after 10 cycles can still maintain 83.3% of the initial value (40 vs. 48 kPa) at 100% strain. The hysteresis observed for the elastomer may be caused by the presence of physical interactions between Poly(BCOE)s that can dissipate energy during stretching.

Self-Healing Properties

Figure 5A:
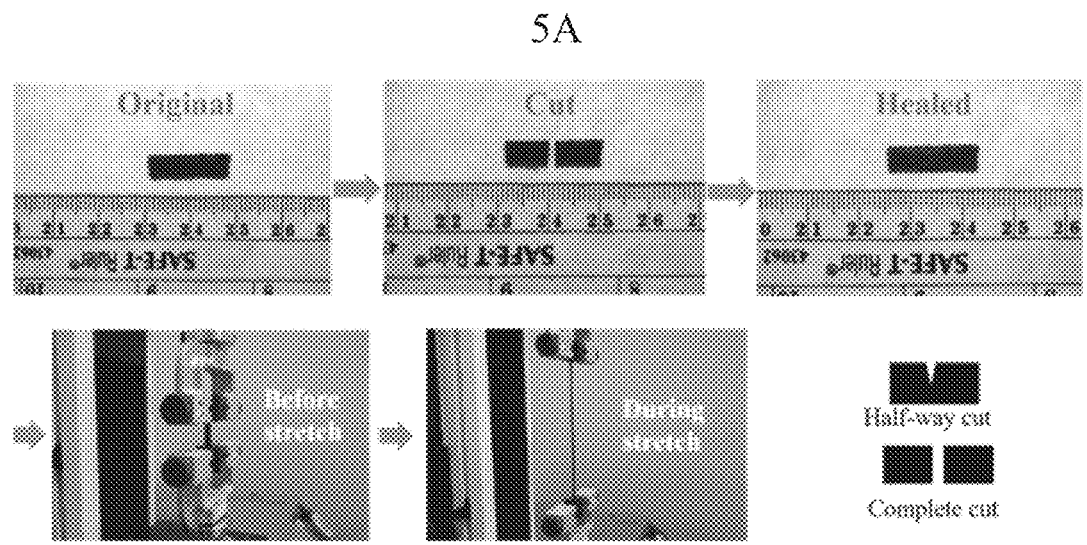
FIGS. 5A-5B.

The self-healing efficiencies of the ASHA-Elastomers were investigated by evaluating the recovery of their mechanical and barrier properties by tensile measurements. FIG. 5A is a photographic scheme showing the healing process of ASHA-C1-Elastomer, wherein the damaged sample was healed for 2 days at ambient condition before the tensile test. The ASHA-Elastomer samples were either completely cut into two halves or partially (about 50%) cut to mimic microcracks that may develop as products age, after which the damaged parts from the fully-cut samples were placed side by side and allowed to self-heal at ambient conditions for 2 days. The control samples (i.e., intact samples) were also kept under the same conditions before testing. With 10 wt % of Poly(BCOE), the ASHA-C1-Elastomer-10 exhibited negligible self-healability after being completely cut, perhaps due to the limited amount of physical-interaction units in the elastomer. The data in Table 2 (below) show that, with increased percentage of Poly (BCOE), ASHA-C1-Elastomer-30 and ASHA-C1-Elastomer-50 showed excellent self-healing capability, which is attributable to the presence of large amounts of H-bonds and their fast molecular dynamics at ambient temperature. Mechanical parameters, including Young's modulus, elongation at break, and ultimate tensile strength of the halfway-cut samples completely recovered after a two-day healing process at ambient conditions (20° C.) for these elastomers. However, for the completely cut samples, the mechanical parameters of ASHA-C1-Elastomer-30 did not completely recover. For example, the elongation at break dropped from 2102% for the control sample to 684% for the self-healed sample. By increasing the Poly(BCOE) content to 50 wt %, the ASHA-C1-Elastomer-50 can completely self-heal as indicated by the fully recovered toughness. Both ASHA-C1-Elastomer-30 and ASHA-C1-Elastomer-50 are useful, depending on the specific requirements for mechanical robustness and self-healing efficiency in different applications.

TABLE 2

Tensile test results of the original samples and self-healed samples after half-way cut or completely cut.

| Material | Sample Status [a] | Young's Modulus (MPa) | Elongation at Break (%) | Toughness (MJ/m³) | Ultimate Tensile Strength (MPa) |
|---|---|---|---|---|---|
| ASHA-C1-Elastomer-30 | Original | 0.48 ± 0.05 | 2101.8 ± 14.4 | 1.73 ± 0.08 | 0.141 ± 0.01 |
| | H-cut[b] | 0.55 ± 0.09 | 2112.3 ± 26.1 | 1.64 ± 0.11 | 0.128 ± 0.03 |
| | C-cut[c] | 0.59 ± 0.09 | 684.2 ± 19.4 | 0.40 ± 0.03 | 0.059 ± 0.01 |
| ASHA-C1-Elastomer-50 | Original | 0.14 ± 0.02 | 2003.3 ± 55.3 | 0.16 ± 0.02 | 0.022 ± 0.002 |
| | H-cut | 0.21 ± 0.01 | 1722.6 ± 22.1 | 0.20 ± 0.01 | 0.033 ± 0.005 |
| | C-cut | 0.11 ± 0.01 | 2196.6 ± 53.5 | 0.22 ± 0.03 | 0.028 ± 0.004 |

[a] The elastomers were cured for one week at r.t. and healed for two days at ambient condition before testing; [b] healed after half-way cut; [c] healed after completely cut.

Figure 5B:
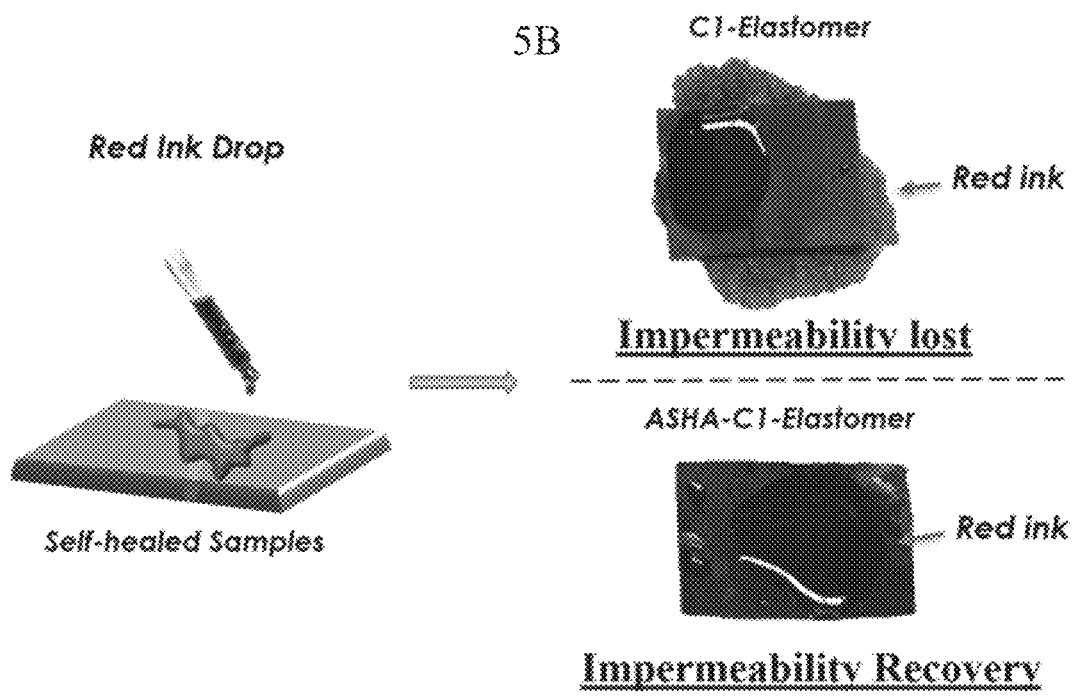

Self-healing efficiency of the ASHA-C1-Elastomers was further evaluated with an ink penetration (permeation) test. FIG. 5B is a schematic showing ink tests for C1-Elastomer and the ASHA-C1-Elastomer-50 self-healed after being completely cut. The samples were cut and healed under the same previously described conditions. It was clearly observed that the red ink easily penetrated the damaged area of the control sample that lacked Poly(BCOE), indicating loss of impermeability after damage. In contrast, ASHA-C1-Elastomer-50 exhibited impermeability after the self-healing process as red ink did not penetrate the damaged area, which again demonstrated the excellent self-healing performance of the ASHA-Elastomers. It was observed that the ASHA-Elastomers need two days for complete recovery of mechanical performance, which is comparable to many of the self-healing materials and slightly longer than a few self-healable materials. This observation is reasonable given that the self-healable component Poly(BCOE) only takes up to 50 wt % of the ASHA-Elastomers, and the main component is a cross-linked polymeric system, which may suppress the fast dynamic of Poly(BCOE) and lead to slightly longer self-healing time. Notably, self-healing at the same location can be repeated at least three times with minimal effect on mechanical properties, which is a great advantage of intrinsic self-healing polymeric materials.

To investigate the effect of temperature, the efficiency of the self-healing process was tested at low (i.e., 0° C.) and high (i.e., 40° C.) temperatures. At 0° C., the elastomer heals much slower with around 80% toughness recovered in 1 week, due to the suppressed molecular dynamics of Poly(BCOE) at temperatures that are close to its $T_g$ (−3° C.). In contrast, at 40° C., a much shorter time, i.e., 12 hours, is required to permit the elastomer to completely self-heal, due to the enhanced molecular dynamics at elevated temperatures.

For products more suited for automotives, outdoors, or even the human body (e.g., flexible electronics), water or high humidity is a factor that often adversely affects their self-healing performance (B. C. Tee et al., *Nat. Nanotechnol.*, 7, 825, 2012). Therefore, the healing efficiency in the presence of water was investigated. ASHA-C1-Elastomer-50 was tested because of its particularly good self-healing performance. The completely cut samples were placed side-by-side and then submerged in a water-filled Teflon dish for 2 days at 20° C. before testing. The results indicate that the obtained mechanical parameters were comparable to the samples that self-healed under water and at ambient conditions, which indicates that the self-healing process of ASHA-Elastomers is insensitive to the presence of water.

Adhesive Properties

Figure 6A:
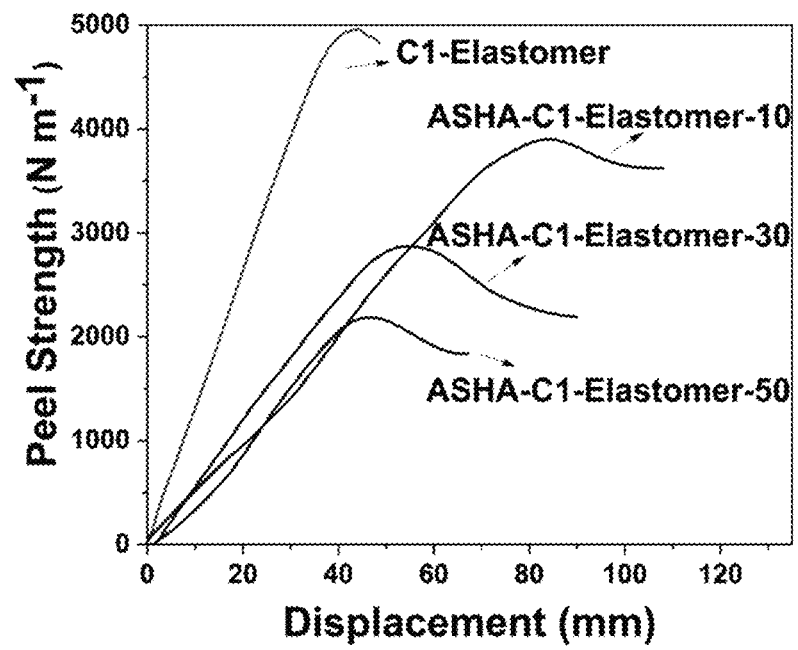
FIGS. 6A-6E.
Figure 6B:
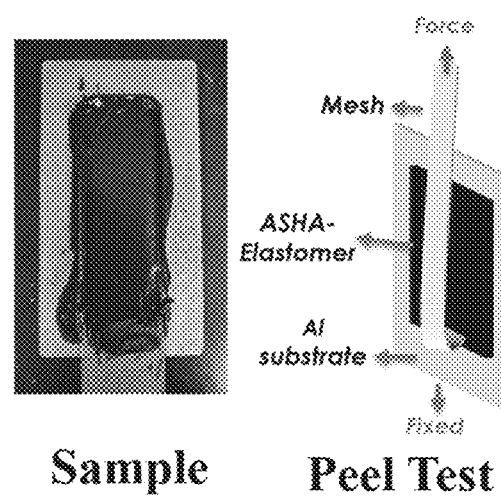
Figure 6C:
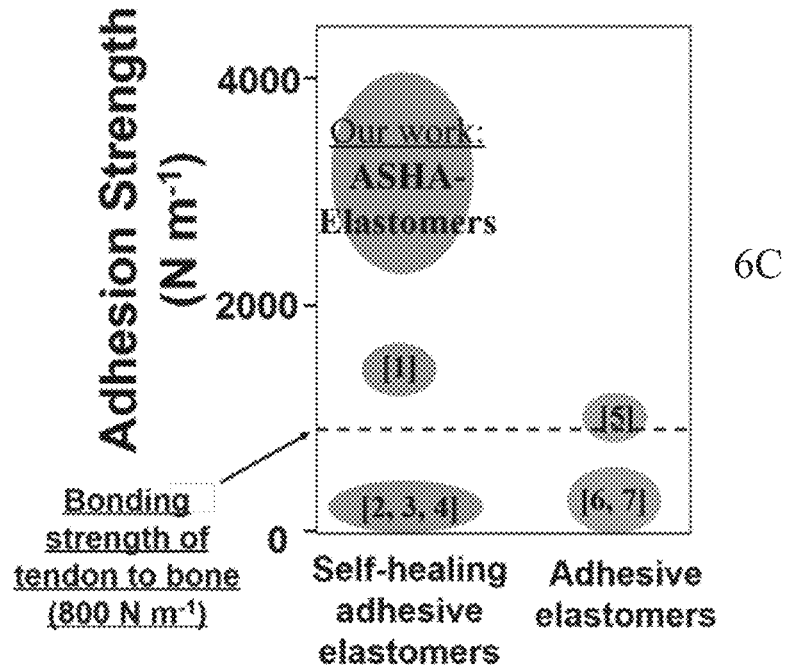

With the development of advanced materials, adhesion has been emerging as a key obstacle in the path towards reliable product and it significantly determines how well the other predesigned functionalities perform. Combining the autonomous self-healing ability with high adhesion force is especially attractive since it can significantly improve the overall performance of elastomers for a wide range of applications. Herein, adhesion properties of the ASHA-Elastomers were evaluated through peel adhesion tests on aluminum substrates following the ASTM C794 test standard. FIG. 6A is a plot of peel strength (as provided by peel tests) of ASHA-C1-Elastomers on an Al substrate. FIG. 6B is a photograph showing the prepared ASHA-Elastomers on an Al substrate (left side) and a schematic illustration of the 180° C. peel test (right side). FIG. 6C is a chart comparing adhesion of ASHA-Elastomers with reported values from the literature. On clean aluminum substrates, C1-Elastomer exhibits a peel strength up to 4960 (±253) N m$^{-1}$ (FIG. 6A). With the incorporation of Poly(BCOE), the peel strengths of ASHA-Elastomers slightly decreased (2187-4132 N m$^{-1}$) but are still far beyond the reported adhesive elastomers (1-1600 N m$^{-1}$), with the results illustrated in FIG. 6C. Notably, the results are significantly higher than the bonding strength of tendon and cartilage to bone (800 N m$^{-1}$).

The temperature effect on peel strength was evaluated on ASHA-C1-Elastomer-30 at 0, 20, and 40° C. It was found that the ASHA-C1-Elastomer-30 exhibits stronger adhesion (3502±238 N m$^{-1}$) at 0° C. than at 20° C. (2888±223 N m$^{-1}$), due to the increased modulus of the elastomer at temperatures that are close to the $T_g$ of Poly(BCOE) (−3° C.) as indicated by DMA measurements. However, changes in adhesion force were not observed between 20 and 40° C. (2884±156 N m$^{-1}$) perhaps due to the absence of a state transition process at this temperature range.

Figure 6D:
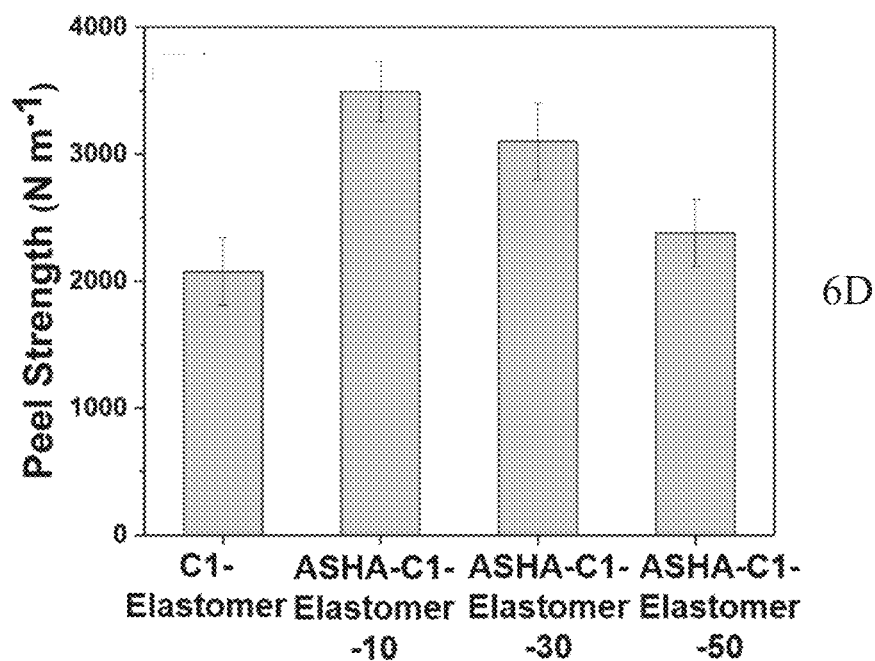

Usually, a perfectly clean surface is difficult or sometimes impossible to prepare in practical deployment, and a dusty surface usually induces adhesion failure in traditional adhesives. FIG. 6D is a plot of peel strength of ASHAC1-Elastomers on a dusty surface. Surprisingly, the ASHA-C1-Elastomers with self-healing capability displayed stronger adhesion strength to dusty substrates than the curable elastomer (i.e., C1-Elastomer), which is opposite to the peel strength results that were obtained from clean substrates (i.e., lower peel strength of ASHA-C1-Elastomers vs. C1-Elastomer). For example, an adhesion force of 3488 N m$^{-1}$ was obtained from ASHA-C1-Elastomer-10 on a dusty surface, which is about 68% higher than that of C1-Elastomer on a dusty substrate (2076 N m$^{-1}$).

Figure 6E:
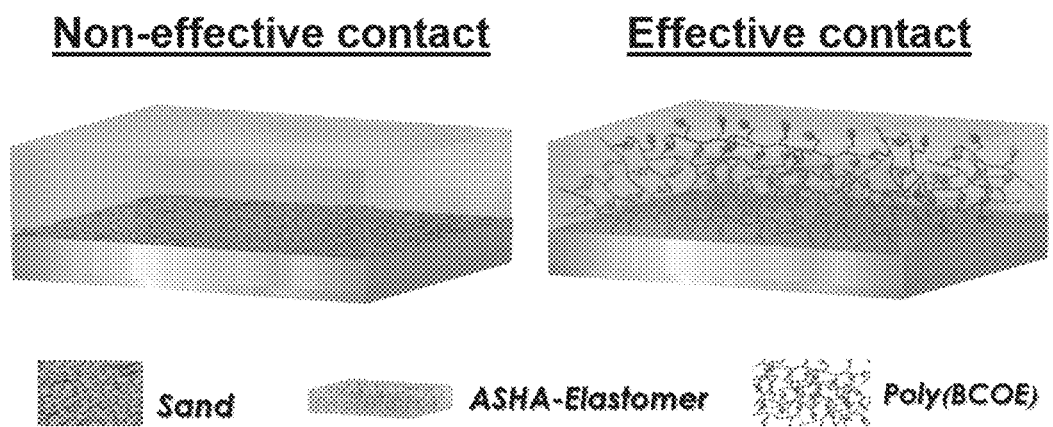

A possible explanation for the higher adhesion of ASHA-Elastomers on the dusty surface is illustrated in FIG. 6E. The presence of dust leads to reduced contact area, and hence, much weaker overall adhesion force between the C1-Elastomer and the substrate. In contrast, the ASHAC1-Elastomers are able to at partially surround or encapsulate the dust particles due to the efficient physical interaction and fast polymer dynamic of Poly(BCOE) at ambient condition. For this reason, as shown by FIG. 6D, the adhesion force of ASHA-C1-Elastomers is not significantly affected by dusty surfaces. The adhesion improvement on dusty surfaces was also observed in ASHA-C2-Elastomers and ASHA-C3-Elastomers, which demonstrates the versatility of the described methodology. The high adhesion strength of the ASHA-Elastomers on dusty surfaces advantageously permits the adhesive composition to be applied to surfaces that cannot be thoroughly cleaned.

The self-recovery efficiency of the adhesion force of damaged samples was also evaluated. The peel test samples were cut in the direction parallel to the substrate and then allowed to self-heal at room temperature. After two days, the peel test showed a 57% recovery of the adhesion force (1240±92 N m−1) compared to that from the original sample (2184±131 N m$^{-1}$). The difference in recovery efficiency of the mechanical properties (100%) and adhesion force (57%) may be caused by the slight detachment of elastomers from the substrate during the cutting process for the adhesion recovery test.

Summary of Results

Herein is reported a series of ASHA-Elastomers exhibiting excellent mechanical properties, autonomous self-healing ability at ambient temperature, and ultra-strong adhesion force to substrates. The ASHA-Elastomers can be simply prepared from synthetic self-healable Poly(BCOE) and commercially available curable elastomers. ASHA-Elastomers can reach elongation at break of about 2000% with overall toughness being 1.73 MJ m$^{-3}$, as indicated by tensile tests. The ASHA-Elastomers display autonomous self-healing ability with completely recovered mechanical properties at ambient environment or underwater conditions, which will considerably extend a material's lifetime under various operational conditions. The ASHA-Elastomers possess ultrahigh adhesion strength on both clean (4132 N m⁻¹) and dusty (3488 N m−1) substrates, which is much stronger than the bonding strength of tendon and cartilage to bone (800 N m⁻¹) in many animals and significantly exceeds previously reported self-healable adhesive elastomers (e.g., 1-1600 N m⁻¹). Moreover, unlike curable elastomers that experience a sharp drop in adhesion force with the presence of dust, the adhesion force of ASHA-Elastomers is negligibly affected by the dust due to the "encapsulation" effect of the dynamic polymer, Poly(BCOE). With these outstanding mechanical properties, self-healing capabilities, and adhesion performance, the ASHA-Elastomer compositions described herein may meet or even exceed the strict requirements of certain industries, such as automotive, building construction, flexible electronics/devices, and other industries.

While there have been shown and described what are at present considered the preferred embodiments of the invention, those skilled in the art may make various changes and modifications which remain within the scope of the invention defined by the appended claims.

What is claimed is:

1. A self-healing adhesive composition comprising a homogeneous mixture of:
(i) a self-healing polymer having the following structure:

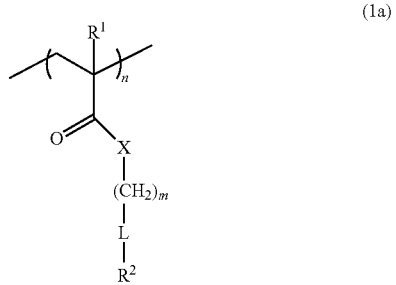

(1a)

wherein:
n is an integer of at least 10;
m is an integer of at least 1;
X is O or NH;
L is a linkage selected from the group consisting of —NHC(O)—, —NHC(O)O—, and —NHC(O)NH—;
$R^1$ is hydrogen atom or methyl; and
$R^2$ is a hydrocarbon group containing at least four carbon atoms, wherein the hydrocarbon group containing at least four carbon atoms is selected from the group consisting of n-butyl, sec-butyl, isobutyl, n-pentyl, isopentyl, n-hexyl, isohexyl, 2-ethylhexyl, n-heptyl, n-octyl, n-nonyl, n-decyl, n-undecyl, n-dodecyl, cyclopentyl, methylcyclopentyl, cyclohexyl, and methylcyclohexyl groups;
and
(ii) an extrudable adhesive polymer base having a curable property and no self-healable property, wherein said extrudable adhesive polymer base has a silicone-containing, acrylate-containing, epoxy-containing, vinyl ether-containing, or polyurethane-containing composition;
wherein component (i) is present in the self-healing adhesive composition in an amount of at least 10 wt % and up to 70 wt % of the total of components (i) and (ii).

2. The composition of claim 1, wherein m is an integer of 2-4.

3. The composition of claim 1, wherein component (i) is present in the self-healing adhesive composition in an amount of at least 10 wt % and up to 60 wt % of the total of components (i) and (ii).

4. The composition of claim 1, wherein said extrudable adhesive polymer base is a sealant polymer base.

5. A method of sealing a space in a material, the method comprising at least partially filling said space with the self-healing adhesive composition of claim 1 and permitting the self-healing adhesive composition to harden over time.

6. The method of claim 5, wherein the hardened self-healing adhesive composition exhibits an adhesion force of at least 500 N·m⁻¹ on said material.

7. The method of claim 5, wherein said extrudable adhesive polymer base is a sealant polymer base.

8. The composition of claim 1, wherein said extrudable adhesive polymer base has a silicone-containing, epoxy-containing, vinyl ether-containing, or polyurethane-containing composition.

* * * * *